United States Patent
Sun et al.

(10) Patent No.: US 12,114,122 B2
(45) Date of Patent: Oct. 8, 2024

(54) WIRELESS EARPHONE, WIRELESS EARPHONE BOX, AND WIRELESS EARPHONE DEVICE

(71) Applicant: VIVO MOBILE COMMUNICATION CO., LTD., Guangdong (CN)

(72) Inventors: Zhen Sun, Guangdong (CN); Xinyang Shangguan, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 219 days.

(21) Appl. No.: 17/989,507

(22) Filed: Nov. 17, 2022

(65) Prior Publication Data
US 2023/0085536 A1    Mar. 16, 2023

Related U.S. Application Data

(63) Continuation of application No. PCT/CN2021/096343, filed on May 27, 2021.

(30) Foreign Application Priority Data

May 29, 2020    (CN) .......................... 202010472671.3

(51) Int. Cl.
*H04R 1/10*      (2006.01)
*A45C 11/00*      (2006.01)
(Continued)

(52) U.S. Cl.
CPC ............ *H04R 1/1025* (2013.01); *A45C 11/00* (2013.01); *A45C 15/00* (2013.01); *H02J 7/0045* (2013.01); *A45C 2011/001* (2013.01)

(58) Field of Classification Search
CPC ....... H04R 1/1025; A45C 11/00; A45C 15/00; A45C 2011/001; H02J 7/0045
(Continued)

(56) References Cited

U.S. PATENT DOCUMENTS 8,891,800 B1 * 11/2014 Shaffer ................ H04R 1/1025
381/384
2010/0197227 A1    8/2010 Heo et al.
(Continued)

FOREIGN PATENT DOCUMENTS

| CN | 106878852 A | 6/2017 |
|----|-------------|--------|
| CN | 207117889 U | 3/2018 |

(Continued)

OTHER PUBLICATIONS

First Office Action for Chinese Application No. 202010472671.3, dated Jul. 19, 2021, 9 Pages.
(Continued)

*Primary Examiner* — Sean H Nguyen
(74) *Attorney, Agent, or Firm* — Brooks Kushman P.C.

(57) ABSTRACT

A wireless earphone, a wireless earphone box, and a wireless earphone device. The wireless earphone includes a first body and a second body. A first end face of the first body is provided with a first magnetic member. A second end face of the second body is provided with a second magnetic member. An outer surface of the second body is provided with a third contact. The second body includes a first battery. The third contact is energized to cause the first body and the second body to be in a connected state or separated state.

19 Claims, 6 Drawing Sheets

(51) Int. Cl.
*A45C 15/00* (2006.01)
*H02J 7/00* (2006.01)

(58) Field of Classification Search
USPC .......................................................... 381/74
See application file for complete search history.

(56) References Cited

U.S. PATENT DOCUMENTS

| | | | |
|---|---|---|---|
| 2010/0320961 | A1 | 12/2010 | Castillo et al. |
| 2014/0211959 | A1* | 7/2014 | Boyajian ................ H04R 5/033 |
| | | | 381/74 |

FOREIGN PATENT DOCUMENTS

| | | | |
|---|---|---|---|
| CN | 207995326 U | 10/2018 | |
| CN | 208768273 U | 4/2019 | |
| CN | 209402698 U | 9/2019 | |
| CN | 209545835 U | 10/2019 | |
| CN | 210008622 U | 2/2020 | |
| CN | 110944264 A | 3/2020 | |
| CN | 210491164 U | 5/2020 | |
| CN | 211089908 U | 7/2020 | |
| CN | 111629298 A | 9/2020 | |
| CN | 111555392 B * | 9/2022 | ......... H01R 13/6205 |
| EP | 3267696 A1 | 1/2018 | |
| JP | H02285578 A | 11/1990 | |
| JP | H0943307 A | 2/1997 | |
| JP | 3112606 U | 8/2005 | |
| JP | 2008182655 A | 8/2008 | |
| JP | 2019186870 A | 10/2019 | |
| JP | 2020057929 A | 4/2020 | |

OTHER PUBLICATIONS

International Search Report and Written Opinion for Application No. PCT /CN2021/096343, dated Aug. 17, 2021, 10 Pages.
First Office Action for Japanese Application No. 2022-573275, dated Dec. 8, 2023, 3 Pages.

* cited by examiner

WIRELESS EARPHONE, WIRELESS EARPHONE BOX, AND WIRELESS EARPHONE DEVICE

CROSS-REFERENCE TO RELATED APPLICATIONS

This application is a continuation of PCT International Application No. PCT/CN2021/096343 filed on May 27, 2021, which claims priority to Chinese Patent Application No. 202010472671.3 filed on May 29, 2020, which are incorporated herein by reference in their entireties.

TECHNICAL FIELD

This application relates to the field of earphone technologies, and in particular, to a wireless earphone, a wireless earphone box, and a wireless earphone device.

BACKGROUND

At present, wireless earphones are more and more popular among users. However, due to compact positioning, the wireless earphones tend to include batteries that tend to have small capacities and are designed to be non-removable. In this way, the battery life of the wireless earphones is short. When electric power of the earphones is low, the batteries of the wireless earphones cannot be removed for replacement. The wireless earphones can only be put in earphone charge cases for charging, which is time-consuming.

Therefore, the batteries of the wireless earphones in the related art are non-replaceable.

SUMMARY

Embodiments of this application provide a wireless earphone, a wireless earphone box, and a wireless earphone device, so as to resolve the problem in the related art that the batteries of the wireless earphones are non-replaceable.

In order to resolve the above technical problem, this application is implemented as follows:

According to a first aspect, an embodiment of this application provides a wireless earphone, the wireless earphone including:
  a first body, the first body including a sound output component, a first end face of the first body being provided with a first magnetic member and a first contact, the first contact being electrically connected to the sound output component; and
  a second body, a second end face of the second body being opposite the first end face, the second end face being provided with a second magnetic member corresponding to the first magnetic member and a second contact corresponding to the first contact, the second body including a first battery, an outer surface of the second body being provided with a third contact;
  where the third contact is energized to cause the first body and the second body to be in a connected state or separated state; in the connected state, the first magnetic member and the second magnetic member have opposite polarities attracting each other, and the first contact is in contact with the second contact, so that the first battery supplies power to the sound output component; and in the separated state, the first magnetic member and the second magnetic member have a same polarity repelling each other.

According to a second aspect, an embodiment of this application provides a wireless earphone box, the wireless earphone box being adapted to the wireless earphone according to the first aspect of this application, the wireless earphone box including:
  a first movable member, the first movable member being provided with a first receiving chamber, the first receiving chamber being configured to store at least the second body of the wireless earphone, a fourth contact being provided on a side wall of the first receiving chamber; in a case that the second body is received in the first receiving chamber, the fourth contact being electrically connected to the third contact of the second body to cause the first body and the second body to be in the connected state or separated state.

According to a third aspect, an embodiment of this application provides a wireless earphone device, including a wireless earphone and a wireless earphone box, the wireless earphone being the wireless earphone according to the first aspect of this application, the wireless earphone box being the wireless earphone box according to the second aspect of this application.

In the embodiments of this application, the wireless earphone is divided into the first body and the second body. The second body includes the first battery, and the third contact of the second body may change a polarity of the second magnetic member from being opposite to a polarity of the first magnetic member to being the same as the polarity of the first magnetic member, so that the first body and the second body are separated and then the second body including the first battery is removed for separate charging or replacement. In this way, when electric power of the wireless earphone is low, the first battery can be charged or replaced through direct removal of the second body, without the need to put the whole wireless earphone in the wireless earphone box for charging, which makes the use of the wireless earphone more convenient.

BRIEF DESCRIPTION OF THE DRAWINGS

To describe the technical solutions of the embodiments of this application more clearly, the following briefly introduces the accompanying drawings required for describing the embodiments of this application. Apparently, the accompanying drawings in the following description show only some embodiments of this application, and a person of ordinary skill in the art may still derive other accompanying drawings from these accompanying drawings without creative efforts.

DETAILED DESCRIPTION

The technical solutions in embodiments of this application are clearly described in the following with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

The terms "include" and any other variants in the specification, claims of the this application mean to cover the non-exclusive inclusion, such as, a process, method, system, product, or device that includes a list of steps or units is not necessarily limited to those steps or units that are expressly listed, but may include other steps or units that are not expressly listed or inherent to such a process, method, product, or device. In addition, the use of "and/or" in the specification and the claims means at least one of the connected objects. For example, A and/or B indicates that there are three cases including A alone, B alone, and both A and B present.

In the embodiments of this application, the word "exemplary" or "for example" or the like is used to represent giving an example, an illustration, or a description. Any embodiment or design solution described as "exemplary" or "for example" in the embodiments of this application should not be explained as being more preferred or having more advantages than another embodiment or design solution. Exactly, the use of the word "exemplary" or "for example" or the like is intended to present a related concept in a specific manner.

Figure 1:
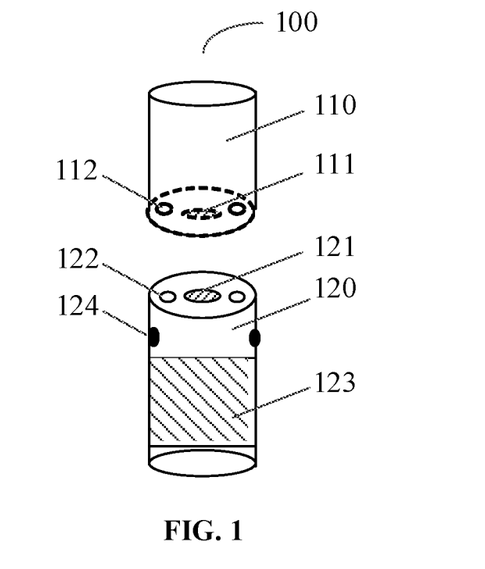
FIG. 1 is a first schematic structural diagram of a wireless earphone according to an embodiment of this application.

An embodiment of this application provides a wireless earphone 100. As shown in FIG. 1, the wireless earphone 100 includes:

a first body 110, the first body 110 including a sound output component, a first end face of the first body 110 being provided with a first magnetic member 111 and a first contact 112, the first contact 112 being electrically connected to the sound output component; and a second body 120, a second end face of the second body 120 being opposite the first end face, the second end face being provided with a second magnetic member 121 corresponding to the first magnetic member 111 and a second contact 122 corresponding to the first contact 112, the second body 120 including a first battery 123, an outer surface of the second body 120 being provided with a third contact 124.

The third contact 124 is energized to cause the first body 110 and the second body 120 to be in a connected state or separated state. In the connected state, the first magnetic member 111 and the second magnetic member 121 have opposite polarities attracting each other, and the first contact 112 is in contact with the second contact 122, so that the first battery 123 supplies power to the sound output component. In the separated state, the first magnetic member 111 and the second magnetic member 121 have a same polarity repelling each other.

In this embodiment of this application, as shown in FIG. 1, the wireless earphone 100 includes the first body 110 and the second body 120. The first body 110 is an upper part of the wireless earphone 100, which may include a sound output component (not shown in FIG. 1) of the wireless earphone 100, and may specifically include an earphone circuit and a sound output structure of the wireless earphone. The second body 120 is a lower part of the wireless earphone 100, which may include the first battery 123. When the first body 110 and the second body 120 are in the connected state, the first contact 112 is in contact with the second contact 122 to realize electrical communication between the first body 110 and the second body 120, and the first battery 123 may be electrically connected to the sound output component in the first body 110 to supply power to the wireless earphone 100. An appearance structure of the wireless earphone 100 may be shown in FIG. 2.

As shown in FIG. 1, the first end face of the first body 110 is provided with the first magnetic member 111, and the second end face of the second body 120 is provided with the second magnetic member 121. The second magnetic member 121 is a polarity-variable magnetic member, and the polarity of the second magnetic member 121 may be changed by a current.

Specifically, the outer surface of the second body 120 is provided with the third contact 124. When the third contact 124 is positively energized, the second magnetic member 121 and the first magnetic member 111 have opposite polarities attracting each other, so that the first body 110 and the second body 120 of the wireless earphone 100 are in the connected state. When the third contact 124 is reversely energized, the polarity of the second magnetic member 121 may be reversed, and the second magnetic member 121 and the first magnetic member 111 have a same polarity repelling each other, so that the first body 110 and the second body 120 of the wireless earphone 100 are in the separated state.

In this embodiment of this application, the second magnetic member 121 and the first magnetic member 111 have opposite polarities by default, and the first body 110 and the second body 120 are in the connected state, that is, a normal use state of the wireless earphone 100. When electric power of the wireless earphone 100 is low, the polarity of the second magnetic member 121 is reversed through reverse energization of the third contact 124. For example, an on/off key may be provided outside the wireless earphone 100, and the third contact 124 is reversely energized when the on/off key is pressed, or the wireless earphone 100 may be put in a wireless earphone box 200, and the third contact 124 is reversely energized by a power supply module of the wireless earphone box 200, which is not specifically limited in the embodiments of this application.

When the polarities of the second magnetic member 121 and the first magnetic member 111 change from being opposite to being the same, the second magnetic member 121 and the first magnetic member 111 repel each other to produce thrust, so that the second body 120 is separated from the first body 110, the second body 120 including the first battery 123 is removed from the wireless earphone 100, and then the first battery 123 in the second body may be charged or replaced with another standby battery.

In the wireless earphone 100 according to this embodiment of this application, the wireless earphone 100 is divided into the first body 110 and the second body 120. The second body 120 includes the first battery 123, and the third contact 124 is energized to change a polarity of the second magnetic member 121 from being opposite to a polarity of the first magnetic member 111 to being the same as the polarity of the first magnetic member 111, so that the first body 110 and the second body 120 are separated and then the second body 120 including the first battery 123 is removed for separate charging or replacement. In this way, when electric power of the wireless earphone 100 is low, the first battery 123 can be charged or replaced through direct removal of the second body 120, without the need to put the whole wireless earphone 100 in the wireless earphone box for charging, which makes the use of the wireless earphone 100 more convenient.

Figure 3:
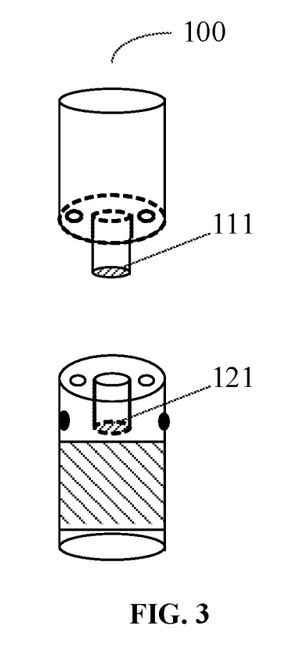
FIG. 3 is a second schematic structural diagram of a wireless earphone according to an embodiment of this application.

Optionally, as shown in FIG. 3, the first end face is provided with a protruding portion, the second end face is provided with a groove matching the protruding portion, the first magnetic member 111 is provided on a top surface of the protruding portion, and the second magnetic member 121 is provided on a bottom surface of the groove; or the second end face is provided with a protruding portion, and the first end face is provided with a groove matching the protruding portion; the second magnetic member 121 is provided on a top surface of the protruding portion, and the first magnetic member 111 is provided on a bottom surface of the groove.

At least two implementations are included in this embodiment:

In the first implementation, as shown in FIG. 3, the first end face of the first body 110 is provided with a protruding portion, the first magnetic member 111 is provided on a top surface of the protruding portion, the second end face of the second body 120 is provided with a groove matching the protruding portion, the second magnetic member 121 is provided on a bottom surface of the groove, the protruding portion may extend into the groove, and the first magnetic member 111 and the second magnetic member 121 attract or repel each other.

In the second implementation, the second end face of the second body 120 is provided with a protruding portion, the second magnetic member 121 is provided on a top surface of the protruding portion, the first end face of the first body 110 is provided with a groove matching the protruding portion, the first magnetic member 111 is provided on a bottom surface of the groove, the protruding portion may extend into the groove, and the first magnetic member 111 and the second magnetic member 121 attract or repel each other.

In this way, when the first body 110 is connected to the second body 120, no relative radial movement may occur between the first body 110 and the second body 120, which improves structural stability of the wireless earphone 100.

Based on the above, the wireless earphone 100 according to this embodiment of this application includes the first body 110 and the second body 120. The first end face of the first body 110 is provided with the first magnetic member 111. The second end face of the second body 120 is provided with the second magnetic member 121. The second end face is opposite the first end face. The outer surface of the second body 120 is provided with the third contact 124. The second body 120 includes the first battery 123. The third contact 124 is energized to change the polarity of the second magnetic member 121 from being opposite to the polarity of the first magnetic member 111 to being the same as the polarity of the first magnetic member 111, so that the first body 110 and the second body 120 are separated and then the second body 120 including the first battery 123 is removed for separate charging or replacement. In this way, when electric power of the wireless earphone 100 is low, the first battery 123 can be charged or replaced through direct removal of the second body 120, without the need to put the whole wireless earphone 100 in the wireless earphone box for charging, which makes the use of the wireless earphone 100 more convenient.

Figure 2:
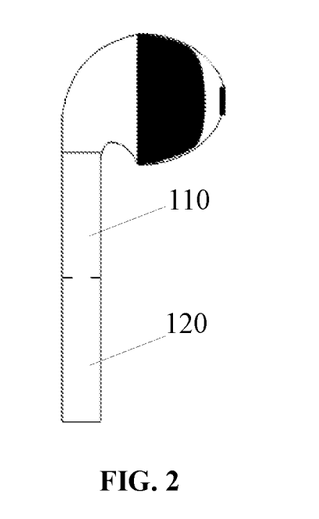
FIG. 2 is a schematic diagram of an appearance of a wireless earphone according to an embodiment of this application.

An embodiment of this application further provides a wireless earphone box 200 adapted to the wireless earphone 100 shown in FIG. 1 to FIG. 3.

Figure 4:
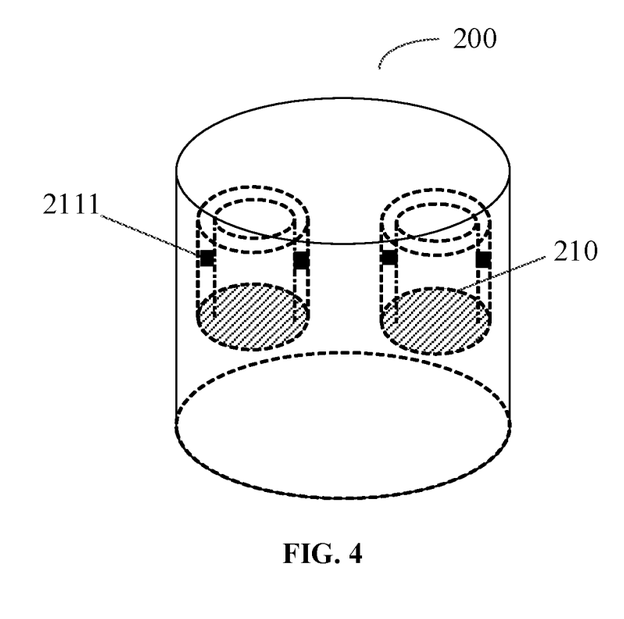
FIG. 4 is a first schematic structural diagram of a wireless earphone box according to an embodiment of this application.

As shown in FIG. 4, the wireless earphone box 200 includes:

a first movable member 210. The first movable member 210 is provided with a first receiving chamber. The first receiving chamber is configured to store at least the second body 120 of the wireless earphone 100. A fourth contact 2111 is provided on a side wall of the first receiving chamber. In a case that the second body 120 is received in the first receiving chamber, the fourth contact 2111 is electrically connected to the third contact 124 of the second body 120 to cause the first body 110 and the second body 120 to be in the connected state or separated state.

In this embodiment of this application, the wireless earphone box 200 includes the first movable member 210. The first receiving chamber is provided on the first movable member 210, which may be configured to store at least the second body 120 of the wireless earphone 100. In other words, the first receiving chamber may receive at least a lower part of the wireless earphone 100.

In this embodiment of this application, two first movable members 210 may be provided. The two first movable members 210 may be symmetrically provided in the wireless earphone box 200. Correspondingly, two first receiving chambers may also be provided to respectively receive a left-ear earphone and a right-ear earphone of a two-ear wireless earphone 100. It may be understood that one first movable member 210 may be provided according to an actual requirement, and the first receiving chamber provided correspondingly may be configured to receive a single-ear wireless earphone 100. Four, six, or other even numbers of first movable members 210 may also be provided, and first receiving chambers provided correspondingly may be configured to receive two sets or three sets or a plurality of sets of two-ear wireless earphones 100, which is not specifically limited in the embodiments of this application.

In this embodiment of this application, descriptions are based on an example in which two first movable members 210 are provided and the two first movable members 210 are symmetrically provided in the wireless earphone box 200.

As shown in FIG. 4, the fourth contact 2111 is provided on a side wall of the first receiving chamber. The fourth contact 2111 may be electrically connected to the power supply module of the wireless earphone box 200. When the second body 120 of the wireless earphone 100 shown in FIG. 1 or FIG. 3 is received in the first receiving chamber, the fourth contact 2111 may contact the third contact 124 on the outer surface of the second body 120. The power supply module of the wireless earphone box 200 energizes the third contact 124 through the fourth contact 2111, to cause the first body 110 and the second body 120 of the wireless earphone 100 to be in the connected state or separated state.

When the electric power of the wireless earphone 100 is low, the second body 120 of the wireless earphone 100 may be put in the first receiving chamber of the wireless earphone box 200, the power supply module of the wireless earphone box 200 is controlled to reversely energize the third contact 124 to cause the polarity of the second magnetic member 121 of the wireless earphone 100 to be reversed, the second magnetic member 121 and the first magnetic member 111 repel each other to produce thrust, and the second body 120 is separated from the first body 110. The second body 120 including the first battery 123 may be removed from the wireless earphone 100.

Then, the removed second body 120 is left in the wireless earphone box 200, and a charge circuit in the wireless earphone box 200 may charge the second body 120, so that the second body 120 can be connected to the first body 110 again upon completion of the charging, and then the wireless earphone 100 can be continuously used. Certainly, after the removed second body 120 is left in the wireless earphone box 200 for charging, another body including a standby battery may also be used to connect the first body 110, and then the wireless earphone 100 is continuously used.

In the wireless earphone box 200 according to this embodiment of this application, when the second body 120 of the wireless earphone 100 is received in the first receiving chamber, the fourth contact 2111 provided on the side wall of the first receiving chamber may be electrically connected to the third contact 124 on the outer surface of the second body 120 to change the polarity of the second magnetic member 121 of the wireless earphone 100, so that the first body 110 and the second body 120 are separated, and then the second body 120 including the first battery 123 is removed for separate charging or replacement. In this way, when electric power of the wireless earphone 100 is low, the first battery 123 can be charged or replaced through direct removal of the second body 120 by using the wireless earphone box 200, without the need to put the whole wireless earphone in the wireless earphone box for charging, so that the function of the wireless earphone box 200 is more in line with the requirement of the wireless earphone 100.

In an implementation, the wireless earphone box 200 may include a first control module. When the wireless earphone box 200 detects that the second body 120 of the wireless earphone 100 is received in the first receiving chamber, the first control module is started to control the power supply module to energize the fourth contact 2111 in the first receiving chamber to cause the first body 110 and the second body 120 of the wireless earphone 100 to be separated. Alternatively, the wireless earphone box 200 may be provided with a first control button. When the first control button is pressed, the first control module is started. Alternatively, the wireless earphone box 200 may be provided with a first delay apparatus, and after the second body 120 of the wireless earphone 100 is received in the first receiving chamber, the first control module is automatically started after a preset time of delay, which is not specifically limited in the embodiments of this application.

Figure 5:
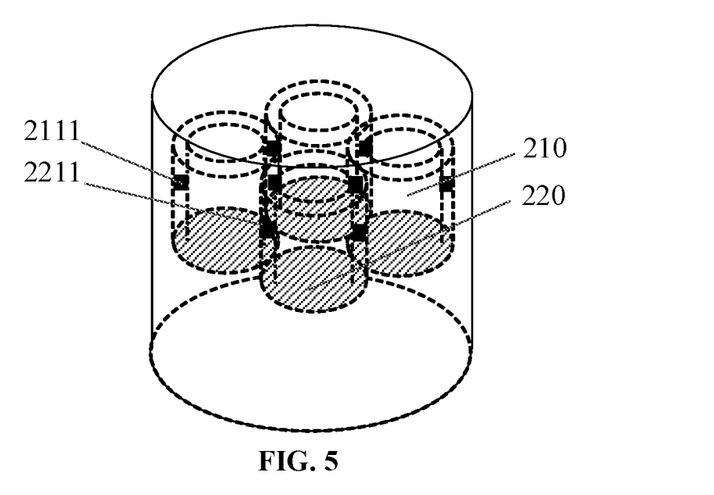
FIG. 5 is a second schematic structural diagram of a wireless earphone box according to an embodiment of this application.

Optionally, as shown in FIG. 5, the wireless earphone box 200 further includes:
- a second movable member 220, the second movable member 220 being provided with a second receiving chamber, a third body being received in the second receiving chamber, the third body including a second battery, a fifth contact being provided on an outer surface of the third body, a sixth contact 2211 being provided on a side wall of the second receiving chamber; and
- a driving mechanism, the driving mechanism being connected to the first movable member 210 and the second movable member 220, in a case that the second body 120 is received in the first receiving chamber, the driving mechanism being configured to drive the first movable member 210 and the second movable member 220 to switch between a first state and a second state.

When the first movable member 210 and the second movable member 220 are in the first state, the fourth contact 2111 is electrically connected to the third contact 124 to control the first body 110 and the second body 120 to be in a connected state or separated state. In a case that the first movable member 210 and the second movable member 220 are in the second state, the sixth contact 2211 is electrically connected to the fifth contact to control the first body 110 and the third body to be in a connected state or separated state.

In this embodiment, the wireless earphone box 200 further includes the second movable member 220 and the driving mechanism. The third body including the second battery is received in the second movable member 220. The second battery may be understood as a standby battery of the wireless earphone 100. The third body may be understood as a standby second body 120. It may be understood that structures of the third body and the second body 120 may be exactly the same. A third end face of the third body is also provided with a polarity-variable magnetic member corresponding to the first magnetic member 111 and also provided with a contact corresponding to the first contact 112.

Two second movable members 220 may be provided. The two second movable members 220 may be symmetrically provided in the wireless earphone box 200. Correspondingly, two second receiving chambers may also be provided to respectively receive a second battery of the left-ear earphone and a second battery of the right-ear earphone of the two-ear wireless earphone 100. It may be understood that one second movable member 220 may be provided according to an actual requirement, and the second receiving chamber provided correspondingly may be configured to receive a second battery of a single-ear wireless earphone 100. Four, six, or other even numbers of second movable members 220 may also be provided, and second receiving chambers provided correspondingly may be configured to receive second batteries of two sets or three sets or a plurality of sets of two-ear wireless earphones 100. No limitation is made herein.

In this embodiment, descriptions are based on an example in which two second movable members 220 are provided and the two second movable members 220 are symmetrically provided in the wireless earphone box 200. In an implementation, the first movable member 210 and the second movable member 220 may be provided in the wireless earphone box 200 according to the top views shown in FIG. 6a and FIG. 6b. A1 and A2 are the first movable members 210, and B1 and B2 are the second movable members 220.

Figure 6A:
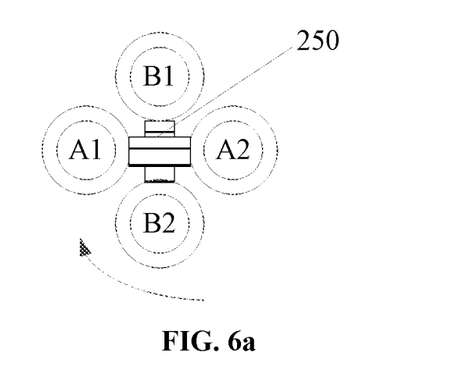
FIG. 6a is a first partial top view of a wireless earphone box according to an embodiment of this application.
Figure 6B:
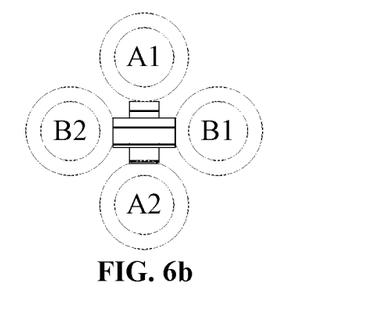
FIG. 6b is a first partial top view of a wireless earphone box according to an embodiment of this application.

When the electric power of the wireless earphone 100 is low, the second body 120 of the wireless earphone 100 may be received in the first receiving chamber. In this case, the first body 110 and the second body 120 of the wireless earphone 100 are connected, the first movable member 210 is located below the first body 110 of the wireless earphone 100, and the first movable member 210 and the second movable member 220 are in the first state. The fourth contact 2111 in the first receiving chamber reversely energizes the third contact 124 of the second body 120, and the second body 120 and the first body 110 of the wireless earphone 100 are separated, to realize removal of the first battery 123.

Then, the driving mechanism may drive the first movable member 210 and the second movable member 220 to move to cause the second movable member 220 receiving the third body to move below the first body 110 of the wireless earphone 100. In this case, the first movable member 210 and the second movable member 220 are in the second state. Since the structures of the third body and the second body 120 are exactly the same, the sixth contact 2211 in the second receiving chamber positively energizes the fifth contact on the third body, so that the second magnetic member on the third body and the first magnetic member 111 on the first body 110 have opposite polarities attracting each other, then the third body is connected to the first body 110, and an earphone circuit of the wireless earphone 100 begins to be powered by the second battery.

Then, the removed second body 120 is left in the wireless earphone box 200. The charge circuit in the wireless earphone box 200 may charge the second body 120. When electric power of the second battery in the third body is low, the third body may be removed in the same manner to replace the fully charged second body 120, and the wireless earphone box 200 continues charging the second battery of the third body. In this way, the first battery and the second battery may be continuously and cyclically replaced to ensure continuous and sufficient electric power of the wireless earphone 100, and users do not need to spend time waiting for the wireless earphone 100 to be charged, which improves user experience.

In an implementation, the wireless earphone box 200 may include a second control module. When the wireless earphone box 200 detects that the first body 110 and the second body 120 of the wireless earphone 100 are separated, the second control module may control the driving mechanism to drive the first movable member 210 and the second movable member 220 to move. Alternatively, the wireless earphone box 200 may be provided with a second control button. When the second control button is pressed, the second control module is started. Alternatively, the wireless earphone box 200 may be provided with a second delay apparatus, and after the first body 110 and the second body 120 of the wireless earphone 100 are separated, the second control module is automatically started after a preset time of delay. No limitation is made herein.

In this embodiment, the second movable member 220 receiving the third body is provided in the wireless earphone box 200. The third body includes a second battery. After the second body 120 including the first battery 123 is removed from the wireless earphone 100, through the driving of the driving mechanism, the third body including the second battery may be automatically mounted without user manual operations, so that the wireless earphone 100 automatically replaces the battery. At the same time, the replacement of the second battery and the first battery can ensure continuous and sufficient electric power of the wireless earphone 100, and the users do not need to spend time waiting for the wireless earphone 100 to be charged, which improves user experience.

Figure 7:
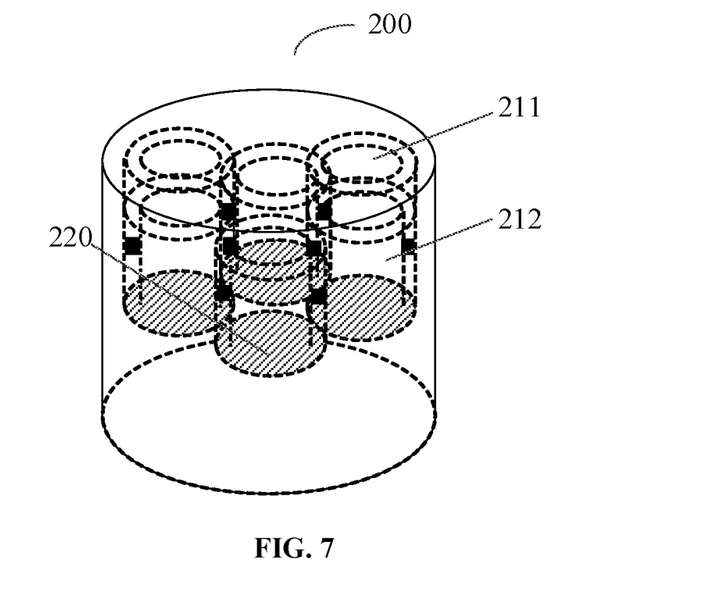
FIG. 7 is a third schematic structural diagram of a wireless earphone box according to an embodiment of this application.

Further, as shown in FIG. 7, the first movable member 210 includes a first connecting member 211 and a second connecting member 212, the first connecting member 211 is provided with a third receiving chamber, the second connecting member 212 is provided with the first receiving chamber, the third receiving chamber is configured to receive the first body 110 of the wireless earphone 100, and the first receiving chamber is configured to receive the second body 120.

The driving mechanism is connected to the second connecting member 212 and the second movable member 220. In a case that the second body 120 is received in the first receiving chamber, the driving mechanism is configured to drive the second connecting member 212 and the second movable member 220 to switch between a first state and a second state.

In this embodiment, as shown in FIG. 7, the first movable member 210 includes the first connecting member 211 and the second connecting member 212, and both the first body 110 and the second body 120 of the wireless earphone 100 may be received in the first movable member 210. The second connecting member 212 and the second movable member 220 are at a same level height, and structures of the second connecting member 212 and the second movable member 220 may be exactly the same.

In an implementation, the second connecting member 212 and the second movable member 220 may also be provided in the wireless earphone box 200 according to the top views shown in FIG. 6a and FIG. 6b. A1 and A2 are the second connecting members 212, and B1 and B2 are the second movable members 220.

In this embodiment, the first connecting member 211 may be understood as being fixed to the wireless earphone box 200. When the wireless earphone 100 is received in the first movable member 210, the driving mechanism may drive the second connecting member 212 and the second movable member 220 to switch between the first state and the second state, while a position of the first connecting member 211 may not change.

Specifically, when the second connecting member 212 and the second movable member 220 are in the first state, the second connecting member 212 is located below the first connecting member 211, the third receiving chamber is communicated with the first receiving chamber, the first body 110 and the second body 120 of the wireless earphone 100 are connected, the fourth contact 2111 in the first receiving chamber reversely energizes the third contact 124 of the second body 120, and the second body 120 and the first body 110 of the wireless earphone 100 are separated, to realize removal of the second body 120 including the first battery 123.

Then, the first connecting member 211 remains fixed, the driving mechanism may drive the second connecting member 212 and the second movable member 220 to move to cause the second movable member 220 receiving the third body to move below the first connecting member 211, and the second receiving chamber is communicated with the third receiving chamber. The sixth contact 2211 in the second receiving chamber positively energizes the fifth contact on the third body, so that the third body is connected to the first body 110, and an earphone circuit of the wireless earphone 100 begins to be powered by the second battery.

In this embodiment, when the battery in the wireless earphone 100 needs to be replaced, the wireless earphone 100 is entirely put in the wireless earphone box 200, the first body 110 of the wireless earphone 100 is fixed through the first connecting member 211, the driving mechanism drives the second connecting member 212 and the second movable member 220 to move, and then the second body 120 and the third body are swapped, so that the first body 110 of the wireless earphone 100 is connected to the third body to complete replacement of the battery of the wireless earphone 100 without user intervention, which further improves automation of the replacement of the battery of the wireless earphone 100.

Figure 8:
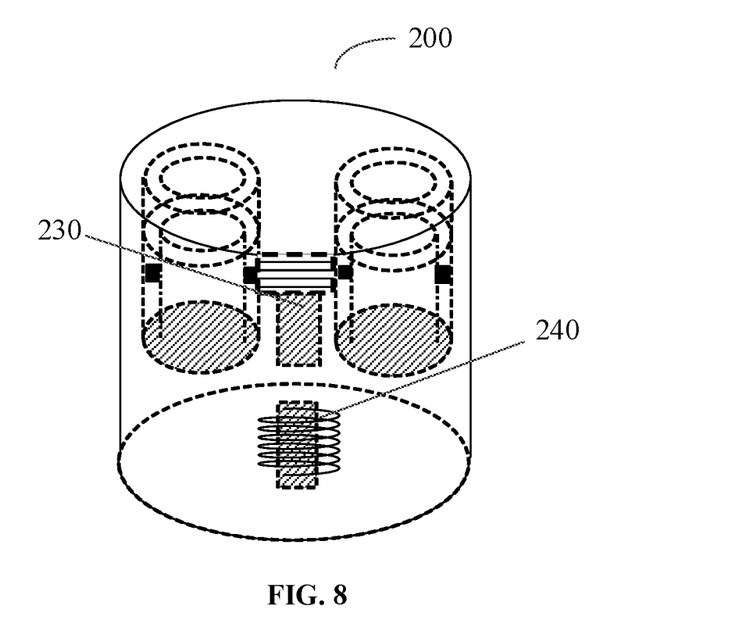
FIG. 8 is a first schematic structural diagram of a wireless earphone box not including a second movable member according to an embodiment of this application.

Further, as shown in FIG. 8, the driving mechanism includes a third magnetic member 230 and a fourth magnetic member 240, a first side of the third magnetic member 230 is connected to the second connecting member 212 and the second movable member 220, the fourth magnetic member 240 is fixed to a second side of the third magnetic member 230 at intervals, and the first side is opposite the second side.

The fourth magnetic member 240 is energized to cause the first connecting member 211 and the second connecting member 212 to be in a connected state or separated state. In the connected state, the third magnetic member 230 and the fourth magnetic member 240 have a same polarity repelling each other. In the separated state, the third magnetic member 230 and the fourth magnetic member 240 have opposite polarities attracting each other.

In this embodiment, the driving mechanism includes the third magnetic member 230 and the fourth magnetic member 240. As shown in FIG. 8, the fourth magnetic member 240 may be fixed and energized to change a polarity. Specifically, when the fourth magnetic member 240 is positively energized, the polarity of the fourth magnetic member 240 may be the same as that of the third magnetic member 230, the fourth magnetic member 240 and the third magnetic member 230 repel each other to produce thrust to drive the third magnetic member 230 to move the second connecting member 212 and the second movable member 220 upwards, and the first connecting member 211 is connected to the second connecting member 212.

When the fourth magnetic member 240 is reversely energized, the polarity of the fourth magnetic member 240 may be opposite to that of the third magnetic member 230, the fourth magnetic member 240 and the third magnetic member 230 attract each other to produce tension to drive the third magnetic member 230 to move the second connecting member 212 and the second movable member 220 downwards, and the first connecting member 211 is separated from the second connecting member 212.

In this embodiment, it is a default state of the wireless earphone box 200 that the power supply module of the wireless earphone box 200 positively energizes the fourth magnetic member 240. After the first body 110 and the second body 120 of the wireless earphone 100 are separated, the power supply module of the wireless earphone box 200 may be controlled to reversely energize the fourth magnetic member 240, so that the first connecting member 211 is separated from the second connecting member 212. Then, the driving mechanism moves the second connecting member 212 and the second movable member 220 again. When the second connecting member 212 and the second movable member 220 are in the second state, the power supply module of the wireless earphone box 200 is controlled to positively energize the fourth magnetic member 240, so that the first connecting member 211 is connected to the second movable member 220.

In this way, during replacement of the second body 120 with the third body, the first body 110 and the second body 120 of the wireless earphone 100 are separated, and the first connecting member 211 and the second connecting member 212 are also separated, which prevents high friction resistance between the second connecting member 212 and the first connecting member 211 caused by movement of the second connecting member 212 and the second movable member 220 and further improves the efficiency of the replacement of the battery of the wireless earphone 100.

In an implementation, the wireless earphone box 200 may include a third control module. When the wireless earphone box 200 detects that the first body 110 and the second body 120 of the wireless earphone 100 are separated, the third control module may first control the power supply module to reversely energize the fourth magnetic member 240 to separate the first connecting member 211 from the second connecting member 212 and then control the driving mechanism to be started to drive the second connecting member 212 and the second movable member 220 to move, which is not limited herein.

Figure 9:
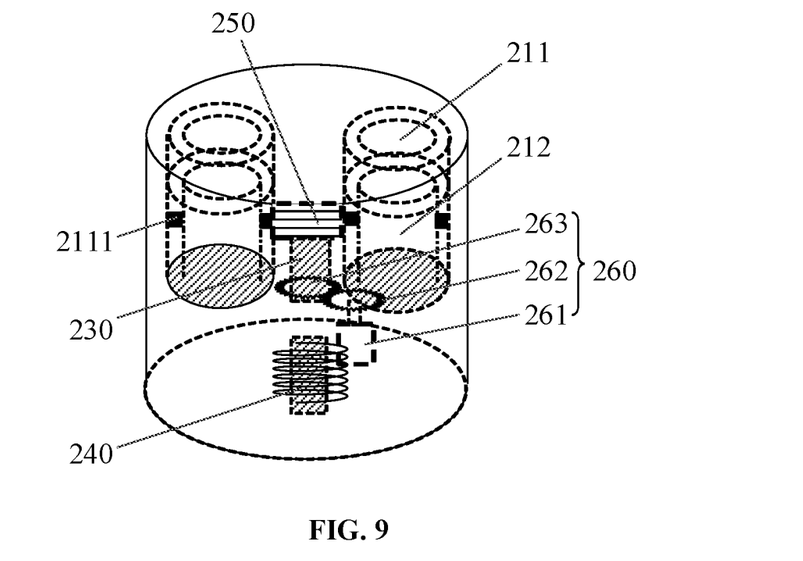
FIG. 9 is a second schematic structural diagram of a wireless earphone box not including a second movable member according to an embodiment of this application.

Further, as shown in FIG. 9, the driving mechanism includes a third connecting member 250 and a driving component 260. The driving component 260 is connected to the third connecting member 250, the third connecting member 250 is connected to the second connecting member 212 and the second movable member 220, and the driving component 260 may drive the third connecting member 250 to rotate to cause the second connecting member 212 and the second movable member 220 to switch between the first state and the second state.

In an implementation, the third connecting member 250 may have a cross structure as shown in FIG. 6a and FIG. 6b. The two second connecting members 212 (A1 and A2) are connected to a first end and a second end of the third connecting member 250 that are disposed opposite, and the two second movable members 220 (B1 and B2) are connected to a third end and a fourth end of the third connecting member 250 that are disposed opposite.

In an implementation, as shown in FIG. 9, the third magnetic member 230 may be connected to the third connecting member 250, and the second connecting member 212 and the second movable member 220 may be driven through the third connecting member 250 to move up and down. A specific implementation form may be obtained with reference to the descriptions in the above embodiment. Details are not described herein again.

Further, as shown in FIG. 9, the driving component 260 includes a driving member 261 and a gear set, the gear set includes a first gear 262 and a second gear 263, the first gear 262 engages with the second gear 263, the first gear 262 is connected to the driving member 261, and the second gear 263 is connected to the third connecting member 250.

The driving member 261 may be a motor or an electric machine, which is not limited herein.

In this embodiment, the third connecting member 250 is driven to rotate through transmission of the gear set. The second connecting member 212 and the second movable member 220 may change positions through rotation. In this way, a movement space reserved inside the wireless earphone box 200 can be saved, and a size of the wireless earphone box 200 can be reduced.

Optionally, the wireless earphone box 200 further includes a charge circuit. When the first movable member 210 and the second movable member 220 are in the first state, the charge circuit is electrically connected to the second receiving chamber to charge the second battery. When the first movable member 210 and the second movable member 220 are in the second state, the charge circuit is electrically connected to the first receiving chamber to charge the first battery 123.

In this embodiment, when the first movable member 210 and the second movable member 220 are in the first state, the first movable member 210 is located below the first body 110 of the wireless earphone 100, the fourth contact 2111 is electrically connected to the third contact 124, and the first body 110 and the second body 120 of the wireless earphone 100 may be controlled to be in the connected state or separated state. In this case, the charge circuit may be electrically connected to the second receiving chamber, the third body including the second battery is received in the second receiving chamber, and the charge circuit may charge the second battery.

When the first movable member 210 and the second movable member 220 are in the second state, the second movable member 210 is located below the first body 110 of the wireless earphone 100, the sixth contact 2211 is electrically connected to the fifth contact, and the first body 110 of the wireless earphone 100 and the third body may be controlled to be in the connected state or separated state. In this case, the charge circuit may be electrically connected to the first receiving chamber, the second body 120 including the first battery 123 is received in the first receiving chamber, and the charge circuit may charge the first battery 123.

In other words, in a case that a standby third body or the removed second body 120 of the wireless earphone 100 is received in the wireless earphone box 200, the battery may be charged through the charge circuit, so that, when the second body 120 and the third body need to be subsequently replaced and mounted again, the new battery may have sufficient electric power, which improves user experience.

Figure 10:
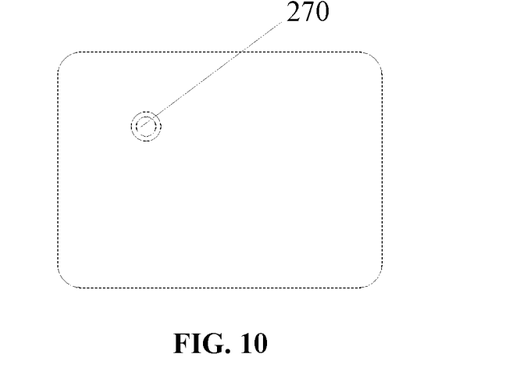
FIG. 10 is a schematic front view of exterior of a wireless earphone box according to an embodiment of this application.

Optionally, as shown in FIG. 10, a key 270 is provided on an outer surface of the wireless earphone box 200, and the key 270 is electrically connected to the fourth contact 2111.

In this embodiment, the key 270 provided on the outer surface of the wireless earphone box 200 may control the wireless earphone box 200 to enable battery replacement. The user may press the key 270 for replacement when battery replacement is required. The user does not press the key when battery replacement is not required, in which case the wireless earphone box 200 may be configured separately to receive the wireless earphone 100.

Figure 11:
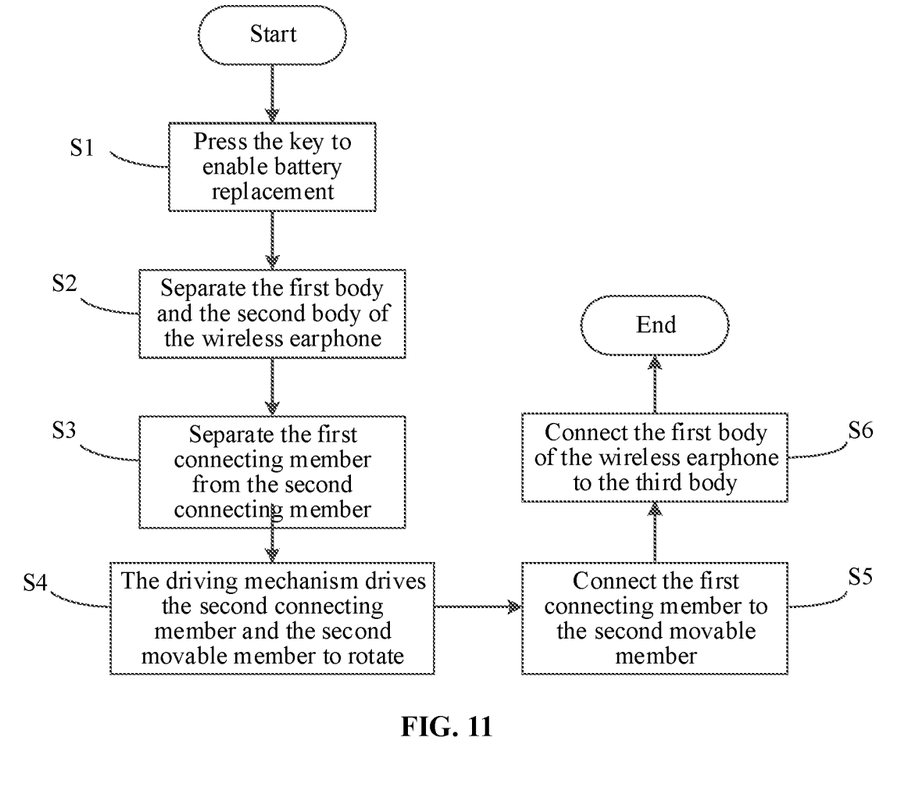
FIG. 11 is a schematic flowchart of replacement of a battery of a wireless earphone according to an embodiment of this application.

With reference to the wireless earphone 100 shown in FIG. 1 and the wireless earphone box 200 shown in FIG. 6*a*, FIG. 6*b*, FIG. 9, and FIG. 10, a specific process of battery replacement in an implementation of this application is as shown in FIG. 11:

When electric power of the wireless earphone is low, the wireless earphone is put in the wireless earphone box, the third receiving chamber receives the first body of the wireless earphone, the first receiving chamber receives the second body of the wireless earphone, and the second receiving chamber receives the third body including the second battery. In this case, the second connecting member and the second movable member are in the first state.

S1: Press the key to enable battery replacement.

S2: Separate the first body and the second body of the wireless earphone.

The key is pressed to start the first control module of the wireless earphone box, the first control module controls the power supply module to reversely energize the third contact of the second body in the first receiving chamber through the fourth contact on the second connecting member, the polarity of the second magnetic member is reversed and changed into being the same as the polarity of the first magnetic member, the second magnetic member and the first magnetic member repel each other, and the first body and the second body of the wireless earphone are separated.

S3: Separate the first connecting member from the second connecting member.

Through the delay apparatus, the second control module is started after a preset time of start of the first control module, the second control module controls the power supply module to reversely energize the fourth magnetic member, the polarity of the fourth magnetic member is reversed and changed into being opposite to the polarity of the third magnetic member, the fourth magnetic member and the third magnetic member attract each other, the third magnetic member drives the second connecting member and the second movable member to move downwards, and the first connecting member is separated from the second connecting member.

S4: The driving mechanism drives the second connecting member and the second movable member to rotate.

Through the delay apparatus, the third control module is started after a preset time of start of the second control module, the third control module controls the motor (the driving member) to operate, and the motor drives the first gear and the second gear to transmit to cause the third connecting member to rotate clockwise, as shown in FIG. 6*a*, in which A1 and A2 are the second connecting members, and B1 and B2 are the second movable members. After the third connecting member rotates by 90° clockwise, the motor stops operating, and the second connecting member and the second movable member change from the state shown in FIG. 6*a* into the state shown in FIG. 6*b*. In this case, the second movable member is located below the first connecting member.

S5: Connect the first connecting member to the second movable member.

After the motor stops operating, the second control module is started again, the second control module controls the power supply module to positively energize the fourth magnetic member, the polarity of the fourth magnetic member changes back to being the same as the polarity of the third magnetic member, the fourth magnetic member and the third magnetic member repel each other, the third magnetic member drives the second connecting member and the second movable member to move upwards, and the first connecting member is connected to the second movable member.

S6: Connect the first body of the wireless earphone to the third body.

Through the delay apparatus, after the second control module controls the power supply module to positively energize the fourth magnetic member, the first control module is started again after a preset time, the first control module controls the power supply module to positively energize the fifth contact on the third body in the second receiving chamber through the sixth contact on the second movable member, the polarity of the second magnetic member changes back to being opposite to the polarity of the first magnetic member, the second magnetic member and the first magnetic member attract each other, and the first body of the wireless earphone is connected to the third body, so as to complete replacement of the battery of the wireless earphone.

Based on the above, the wireless earphone box 200 according to this embodiment of this application includes a first movable member 210. The first movable member 210 is provided with a first receiving chamber. The first receiving chamber is configured to store at least the second body 120 of the wireless earphone 100. A fourth contact 2111 is provided on a side wall of the first receiving chamber. In a case that the second body 120 is received in the first receiving chamber, the fourth contact 2111 is electrically connected to the third contact 124 to cause the first body 110 and the second body 120 to be in the connected state or separated state. When the second body 120 of the wireless earphone 100 is received in the first receiving chamber, the fourth contact 2111 provided on the side wall of the first receiving chamber may be connected to the third contact 124 on the outer surface of the second body 120 to change the polarity of the second magnetic member 121 of the wireless earphone 100, so that the first body 110 and the second body 120 are separated, and then the second body 120 including the first battery 123 is removed for separate charging or replacement. In this way, when electric power of the wireless earphone 100 is low, the first battery 123 can be charged or replaced through direct removal of the second body 120 by using the wireless earphone box 200, without the need to put the whole wireless earphone in the wireless earphone box for charging, so that the function of the wireless earphone box 200 is more in line with the requirement of the wireless earphone 100.

An embodiment of this application further provides a wireless earphone device, including the wireless earphone 100 shown in FIG. 1 to FIG. 3, and the wireless earphone box 200 shown in FIG. 4 to FIG. 10.

The wireless earphone device may implement all the functions that can be implemented by the wireless earphone 100 shown in FIG. 1 to FIG. 3 and the wireless earphone box 200 shown in FIG. 4 to FIG. 10, and achieve the same technical effects. Details are not described herein again so as to avoid repetition.

It should be noted that the terms "include", "comprise", or any other variants thereof in this specification are intended to cover a non-exclusive inclusion, so that a process, method, object, or apparatus including a series of elements not only include those elements, but also include other elements which are not clearly listed, or include inherent elements of the process, method, object, or apparatus. Without more limitations, elements defined by the sentence "including one" does not exclude that there are still another same element in the process, method, object, or apparatus including the element.

Through the descriptions of the foregoing implementations, a person skilled in the art may clearly understand that the methods in the foregoing embodiments may be implemented by means of software and a necessary general hardware platform, and certainly, may also be implemented by hardware, but in many cases, the former manner is a better implementation. Based on such understanding, the technical solutions of this application essentially or some contributing to the prior art may be implemented in a form of a software product. The computer software product is stored in a storage medium, such as a read-only memory (ROM)/random access memory (RAM), a magnetic disk, or an optical disc) and includes several instructions for instructing a terminal (which may be a mobile phone, a computer, a server, an air conditioner, a network device, or the like) to perform the methods described in the embodiments of this application.

The embodiments of this application are described above with reference to the accompanying drawings. However, this application is not limited to the foregoing specific implementations. The foregoing specific implementations are only exemplary and not limitative. Enlightened by this application, a person of ordinary skill in the art may further make many variations without departing from the idea of this application and the protection scope of the claims. All of the variations fall within the protection scope of this application.

What is claimed is:

1. A wireless earphone, comprising:
    a first body, the first body comprising a sound output component, a first end face of the first body being provided with a first magnetic member and a first contact, the first contact being electrically connected to the sound output component; and
    a second body, a second end face of the second body being opposite the first end face, the second end face being provided with a second magnetic member corresponding to the first magnetic member and a second contact corresponding to the first contact, the second body comprising a first battery, an outer surface of the second body being provided with a third contact;
    wherein the third contact is energized to cause the first body and the second body to be in a connected state or separated state; in the connected state, the first magnetic member and the second magnetic member have opposite polarities attracting each other, and the first contact is in contact with the second contact, so that the first battery supplies power to the sound output component; and in the separated state, the first magnetic member and the second magnetic member have a same polarity repelling each other.

2. The wireless earphone according to claim 1, wherein the first end face is provided with a protruding portion, the second end face is provided with a groove matching the protruding portion, the first magnetic member is provided on a top surface of the protruding portion, and the second magnetic member is provided on a bottom surface of the groove; or
    the second end face is provided with a protruding portion, and the first end face is provided with a groove matching the protruding portion; the second magnetic member is provided on a top surface of the protruding portion, and the first magnetic member is provided on a bottom surface of the groove.

3. A wireless earphone box, the wireless earphone box being adapted to the wireless earphone according to claim 1, the wireless earphone box comprising:
    a first movable member, the first movable member being provided with a first receiving chamber, the first receiving chamber being configured to store at least the second body of the wireless earphone, a fourth contact being provided on a side wall of the first receiving chamber; in a case that the second body is received in the first receiving chamber, the fourth contact being electrically connected to the third contact of the second body to cause the first body and the second body to be in the connected state or separated state.

4. The wireless earphone box according to claim 3, further comprising:
    a second movable member, the second movable member being provided with a second receiving chamber, a third body being received in the second receiving chamber, the third body comprising a second battery, a fifth contact being provided on an outer surface of the third body, a sixth contact being provided on a side wall of the second receiving chamber; and
    a driving mechanism, the driving mechanism being connected to the first movable member and the second movable member, in a case that the second body is received in the first receiving chamber, the driving mechanism being configured to drive the first movable member and the second movable member to switch between a first state and a second state;
    wherein, in a case that the first movable member and the second movable member are in the first state, the fourth contact is electrically connected to the third contact to control the first body and the second body to be in a connected state or separated state; and in a case that the first movable member and the second movable member are in the second state, the sixth contact is electrically connected to the fifth contact to control the first body and the third body to be in a connected state or separated state.

5. The wireless earphone box according to claim 4, wherein the first movable member comprises a first connecting member and a second connecting member, the first connecting member being provided with a third receiving chamber, the second connecting member being provided with the first receiving chamber, the third receiving chamber being configured to receive the first body of the wireless earphone, the first receiving chamber being configured to receive the second body; and the driving mechanism is connected to the second connecting member and the second movable member, and in a case that the second body is received in the first receiving chamber, the driving mechanism is configured to drive the second connecting member and the second movable member to switch between the first state and the second state.

6. The wireless earphone box according to claim 5, wherein the driving mechanism comprises a third magnetic member and a fourth magnetic member, a first side of the third magnetic member being connected to the second connecting member and the second movable member, the fourth magnetic member being fixed to a second side of the third magnetic member at intervals, the first side being opposite the second side; and the fourth magnetic member is energized to cause the first connecting member and the second connecting member to be in a connected state or separated state; in the connected state, the third magnetic member and the fourth magnetic member have a same polarity repelling each other; and in the separated state, the third magnetic member and the fourth magnetic member have opposite polarities attracting each other.

7. The wireless earphone box according to claim 5, wherein the driving mechanism comprises a third connecting member and a driving component, the driving component being connected to the third connecting member, the third connecting member being connected to the second connecting member and the second movable member, the driving component driving the third connecting member to rotate to cause the second connecting member and the second movable member to switch between the first state and the second state.

8. The wireless earphone box according to claim 7, wherein the driving component comprises a driving member and a gear set, the gear set comprising a first gear and a second gear, the first gear engaging with the second gear, the first gear being connected to the driving member, the second gear being connected to the third connecting member.

9. The wireless earphone box according to claim 4, further comprising a charge circuit, in a case that the first movable member and the second movable member are in the first state, the charge circuit being electrically connected to the second receiving chamber to charge the second battery; in a case that the first movable member and the second movable member are in the second state, the charge circuit being electrically connected to the first receiving chamber to charge the first battery.

10. The wireless earphone box according to claim 3, wherein a key is provided on an outer surface of the wireless earphone box, the key being electrically connected to the fourth contact.

11. A wireless earphone device, comprising a wireless earphone and a wireless earphone box, the wireless earphone being the wireless earphone according to claim 1, wherein the wireless earphone box is adapted to the wireless earphone, and the wireless earphone box comprises:

a first movable member, the first movable member being provided with a first receiving chamber, the first receiving chamber being configured to store at least the second body of the wireless earphone, a fourth contact being provided on a side wall of the first receiving chamber; in a case that the second body is received in the first receiving chamber, the fourth contact being electrically connected to the third contact of the second body to cause the first body and the second body to be in the connected state or separated state.

12. The wireless earphone device according to claim 11, wherein the wireless earphone box comprises:

a second movable member, the second movable member being provided with a second receiving chamber, a third body being received in the second receiving chamber, the third body comprising a second battery, a fifth contact being provided on an outer surface of the third body, a sixth contact being provided on a side wall of the second receiving chamber; and a driving mechanism, the driving mechanism being connected to the first movable member and the second movable member, in a case that the second body is received in the first receiving chamber, the driving mechanism being configured to drive the first movable member and the second movable member to switch between a first state and a second state;

wherein, in a case that the first movable member and the second movable member are in the first state, the fourth contact is electrically connected to the third contact to control the first body and the second body to be in a connected state or separated state; and in a case that the first movable member and the second movable member are in the second state, the sixth contact is electrically connected to the fifth contact to control the first body and the third body to be in a connected state or separated state.

13. The wireless earphone device according to claim 12, wherein the first movable member comprises a first connecting member and a second connecting member, the first connecting member being provided with a third receiving chamber, the second connecting member being provided with the first receiving chamber, the third receiving chamber being configured to receive the first body of the wireless earphone, the first receiving chamber being configured to receive the second body; and the driving mechanism is connected to the second connecting member and the second movable member, and in a case that the second body is received in the first receiving chamber, the driving mechanism is configured to drive the second connecting member and the second movable member to switch between the first state and the second state.

14. The wireless earphone device according to claim 13, wherein the driving mechanism comprises a third magnetic member and a fourth magnetic member, a first side of the third magnetic member being connected to the second connecting member and the second movable member, the fourth magnetic member being fixed to a second side of the third magnetic member at intervals, the first side being opposite the second side; and the fourth magnetic member is energized to cause the first connecting member and the second connecting member to be in a connected state or separated state; in the connected state, the third magnetic member and the fourth magnetic member have a same polarity repelling each other; and in the separated state, the third magnetic member and the fourth magnetic member have opposite polarities attracting each other.

15. The wireless earphone device according to claim 13, wherein the driving mechanism comprises a third connecting member and a driving component, the driving component being connected to the third connecting member, the third connecting member being connected to the second connecting member and the second movable member, the driving component driving the third connecting member to rotate to cause the second connecting member and the second movable member to switch between the first state and the second state.

16. The wireless earphone device according to claim 15, wherein the driving component comprises a driving member and a gear set, the gear set comprising a first gear and a second gear, the first gear engaging with the second gear, the first gear being connected to the driving member, the second gear being connected to the third connecting member.

17. The wireless earphone device according to claim 12, further comprising a charge circuit, in a case that the first movable member and the second movable member are in the first state, the charge circuit being electrically connected to the second receiving chamber to charge the second battery; in a case that the first movable member and the second movable member are in the second state, the charge circuit being electrically connected to the first receiving chamber to charge the first battery.

18. The wireless earphone device according to claim 11, wherein a key is provided on an outer surface of the wireless earphone box, the key being electrically connected to the fourth contact.

19. The wireless earphone device according to claim 11, wherein the first end face is provided with a protruding portion, the second end face is provided with a groove matching the protruding portion, the first magnetic member is provided on a top surface of the protruding portion, and the second magnetic member is provided on a bottom surface of the groove; or the second end face is provided with a protruding portion, and the first end face is provided with a groove matching the protruding portion; the second magnetic member is provided on a top surface of the protruding portion, and the first magnetic member is provided on a bottom surface of the groove.

* * * * *